United States Patent
Sasaki et al.

[11] Patent Number: 5,485,377
[45] Date of Patent: Jan. 16, 1996

[54] APPARATUS AND METHOD FOR CONTROLLING DAMPING FORCE CHARACTERISTIC OF VEHICULAR SHOCK ABSORBER

[75] Inventors: Mitsuo Sasaki; Toshiro Hirai, both of Atsugi City, Japan

[73] Assignees: Unisia Jec Corporation, Kanagawa; Nissan Motor Co., Ltd., Yokohama, both of Japan

[21] Appl. No.: 304,229

[22] Filed: Sep. 12, 1994

[30] Foreign Application Priority Data

Sep. 13, 1993 [JP] Japan .................................. 5-227085

[51] Int. Cl.$^6$ ...................... B60G 17/015; B60G 21/06
[52] U.S. Cl. ...................................... 364/424.05; 280/707
[58] Field of Search ........................ 364/424.05; 280/707

[56] References Cited

U.S. PATENT DOCUMENTS

| | | | |
|---|---|---|---|
| 4,807,128 | 2/1989 | Ikemoto et al. | 364/424.05 |
| 4,827,416 | 5/1989 | Kawagoe et al. | 364/424.05 |
| 5,193,845 | 3/1993 | Yokote et al. | 280/707 |
| 5,235,529 | 8/1993 | Hanson et al. | 364/572 |
| 5,307,907 | 5/1994 | Nakamura et al. | 188/282 |
| 5,310,027 | 5/1994 | Nakamura et al. | 188/299 |
| 5,327,983 | 7/1994 | Yoshioka et al. | 180/41 |
| 5,328,202 | 7/1994 | Kakizaki | 280/707 |
| 5,398,184 | 3/1995 | Yamaoka et al. | 364/424.05 |

FOREIGN PATENT DOCUMENTS

4232111  8/1992  Japan .

Primary Examiner—Michael Zanelli
Attorney, Agent, or Firm—Ronald P. Kananen

[57] ABSTRACT

In an apparatus and method for controlling damping force characteristics of respective vehicular shock absorbers, a control signal V is generated according to a state in which a steering system is operated, the control signal being converted to a drive signal to be input to damping force characteristic changing member (stepping motor and adjuster) so that the damping force characteristic of the corresponding one of the shock absorbers is changed to a desired damping force characteristic. The control signal is a signal synthesized with a bounce rate signal based on a vertical sprung mass velocity signal, a roll rate signal determined on the basis of a difference between both right and left vertical sprung mass velocity signals, a roll rate (displacement) signal determined on the basis of the difference described above, a steering angular displacement signal, and a steering angular velocity signal at a predetermined rate of distribution η. The predetermined rate of distribution (signal systhesis) is varied according to a vehicle speed.

12 Claims, 12 Drawing Sheets

APPARATUS AND METHOD FOR CONTROLLING DAMPING FORCE CHARACTERISTIC OF VEHICULAR SHOCK ABSORBER

BACKGROUND OF THE INVENTION

1. Field of The Invention

The present invention relates to an apparatus and method for optimally controlling damping force characteristics of four tire wheel suspension units (shock absorbers) of an automotive vehicle so as to suppress a rolling motion of the vehicle during a steering operation of the vehicle.

2. Description of Background Art

A Japanese Patent Application First Publication No. Heisei 4-232111 published on Aug. 20, 1992 exemplifies a previously proposed vehicular suspension (shock absorber control) system to carry out damping force characteristic controls of the respective shock absorbers, each shock absorber being interposed between a sprung mass (vehicle body) and an unsprung mass (tire wheel).

In the disclosed shock absorber control system, a vertical sprung mass velocity and a relative velocity between the sprung mass and unsprung mass are detected. If both directions of the sprung mass velocity and relative velocity are the same, the damping force characteristic of the corresponding one of the shock absorbers is set in a hard characteristic. If both directions of the sprung mass velocity and relative velocity are not the same, the damping force characteristic is set in the soft characteristic. This is the damping force characteristic based on a sky hook theory.

However, in the previously proposed damping force characteristic control apparatus disclosed in the above-identified Japanese Patent Application First Publication, a discrimination between a motion of a rolling direction generated on the basis of a steering operation on which the vehicle driver's intention is acted and another motion of the rolling direction generated due to the road surface input is not carried out but a control gain is determined merely according to a magnitude of the vertical sprung mass velocity.

The vehicle driver, however, feels with a great sensitivity that the motion of the rolling direction generated on the basis of the steering operation is greater than the motions of a bouncing direction, pitching direction, and rolling direction generated on the basis of the road surface vibration input due to an action of an inertia moment. Hence, if a value of the suppression of rolling motion during the steering operation is set higher, the control gain with respect to the bouncing motion, pitching motion, and rolling motion generated on the basis of the road surface input are also set higher so that the vehicular comfort can be worsened since the control gain is merely determined according to the magnitude of the sprung mass velocity. As appreciated from above, a degree of freedom of setting the control gain is small.

SUMMARY OF THE INVENTION

It is an object of the present invention to provide an apparatus and method for controlling damping forces of vehicular shock absorbers in which a degree of freedom of setting a control gain during a steering operation is increased so that a sufficient suppression of vehicular rolling motion during the steering operation can be achieved without worsening a vehicular comfort during the vehicle run on a straight road.

The above-described object can be achieved by providing an apparatus for an automotive vehicle, comprising: a) a plurality of shock absorbers, each shock absorber being interposed between a sprung mass and an unsprung mass and having damping force characteristic changing means for operatively setting a damping force characteristic at either of extension and compression stroke side with respect to a piston of the shock absorber to a desired damping force characteristic in response to a drive signal input thereto; b) vertical sprung mass acceleration detecting means for detecting vertical accelerations of the sprung mass at least right and left positions of a vehicle body with respect to a vehicular forward direction and outputting vertical acceleration signals indicative thereof; c) vertical sprung mass velocity determining means for determining vertical sprung mass velocity signals on the basis of the respective vertical sprung mass acceleration signals; d) steering state detecting means for detecting a steering angular displacement and a steering angular velocity from a vehicular steering system and outputting signals indicative thereof; e) controlling means for controlling the damping force characteristic of the respective shock absorber on the basis of a control signal, said control signal being generated by synthesizing a bouncing rate signal calculated on the basis of each corresponding one of the vertical sprung mass velocity signals from the vertical sprung mass determining means for the left and right portions of the vehicle body, a rolling rate signal calculated on the basis of a difference between the respective vertical sprung mass velocity signals, a rolling angular displacement signal calculated on the basis of the difference between the respective vertical sprung mass velocity signal, the steering angular displacement signal and the steering angular velocity signal at a predetermined rate of synthesis and being converted to the drive signal; and f) rate of synthesis setting means for variably setting the predetermined rate of synthesis of each signal synthesized to form the control signal according to the steering angular velocity signal and steering angular displacement signal.

The above-described object can also be achieved by providing a method for controlling damping force characteristics of respective vehicular shock absorbers, comprising the steps of: a) detecting vertical accelerations of the sprung mass at at least two of right and left positions of a vehicle body with respect to a vehicular forward/rearward direction and outputting vertical acceleration signals indicative thereof; b) determining vertical sprung mass velocity signals on the basis of the respective vertical sprung mass acceleration signals; c) detecting a steering angular displacement and a steering angular velocity from a vehicular steering system and outputting signals indicative thereof; d) controlling the damping force characteristic of the respective shock absorber on the basis of a control signal, said control signal being generated by synthesizing a bouncing rate signal based on each corresponding one of the vertical sprung mass velocity signals, a rolling rate signal based on a difference between the respective vertical sprung mass velocity signals, a rolling angular signal, the steering angular displacement signal and the steering angular velocity signal at a predetermined rate of synthesis and being converted to a drive signal; e) variably setting the predetermined rate of synthesis of each signal for the control signal according to the steering angular velocity signal and steering angular displacement signal; and f) changing the damping force characteristic of each shock absorber so as to set a target damping force characteristic in response to the drive signal according to the content of the control signal V.

The damping force characteristics of the respective shock absorbers are controlled on the basis of a control signal. The control signal is a superposed signal of a bouncing rate signal based on a vertical sprung mass velocity, a rolling rate signal based on a difference between vehicular left and right vertical sprung mass velocities, a rolling angular signal, a steering angular displacement signal, and a steering angular velocity signal at a predetermined rate. The predetermined rate described above is variably set according to a steered state.

For example, during the steered state, the rate of synthesis of the rolling rate signal and rolling angular signal is variably set toward a higher value than those of the other signals. Therefore, the sufficient rolling suppression during the steering operation can be achieved without worsening of the vehicular comfort during the vehicle run on the straight road. Thus, since it is possible to synthesize the above-described signals into the control signal according to the steered state, the degree of freedom of setting the control gain becomes higher. The rate of synthesis of each signal can be varied according to a vehicle speed.

BEST MODE CARRYING OUT THE INVENTION

Reference will hereinafter be made to the drawings in order to facilitate a better understanding of the present invention.

Figure 1:
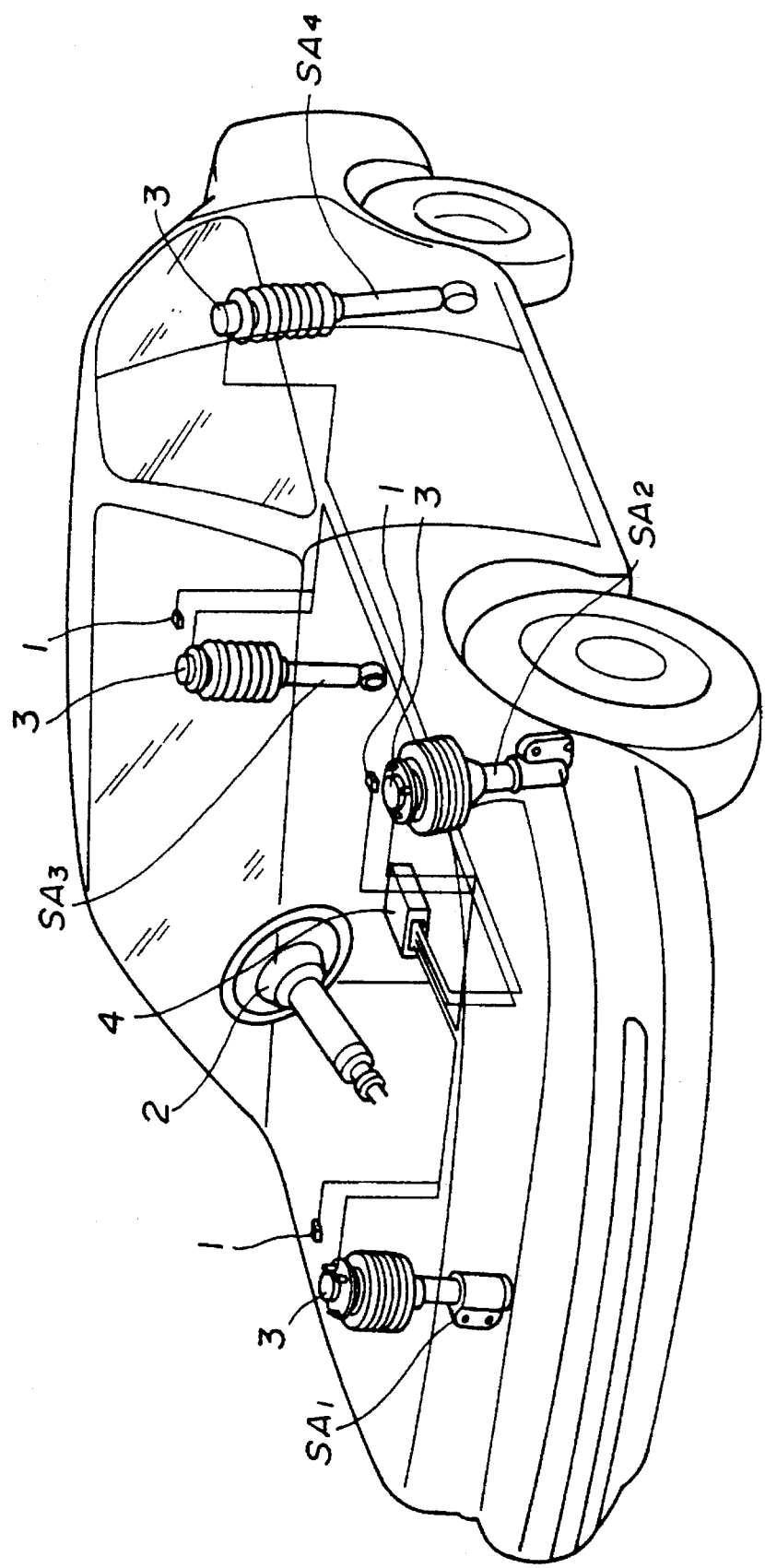
FIG. 1 is an explanatory perspective view of an automotive vehicle in which an apparatus for controlling damping forces of vehicular shock absorbers in a preferred embodiment is mounted.
Figure 2:
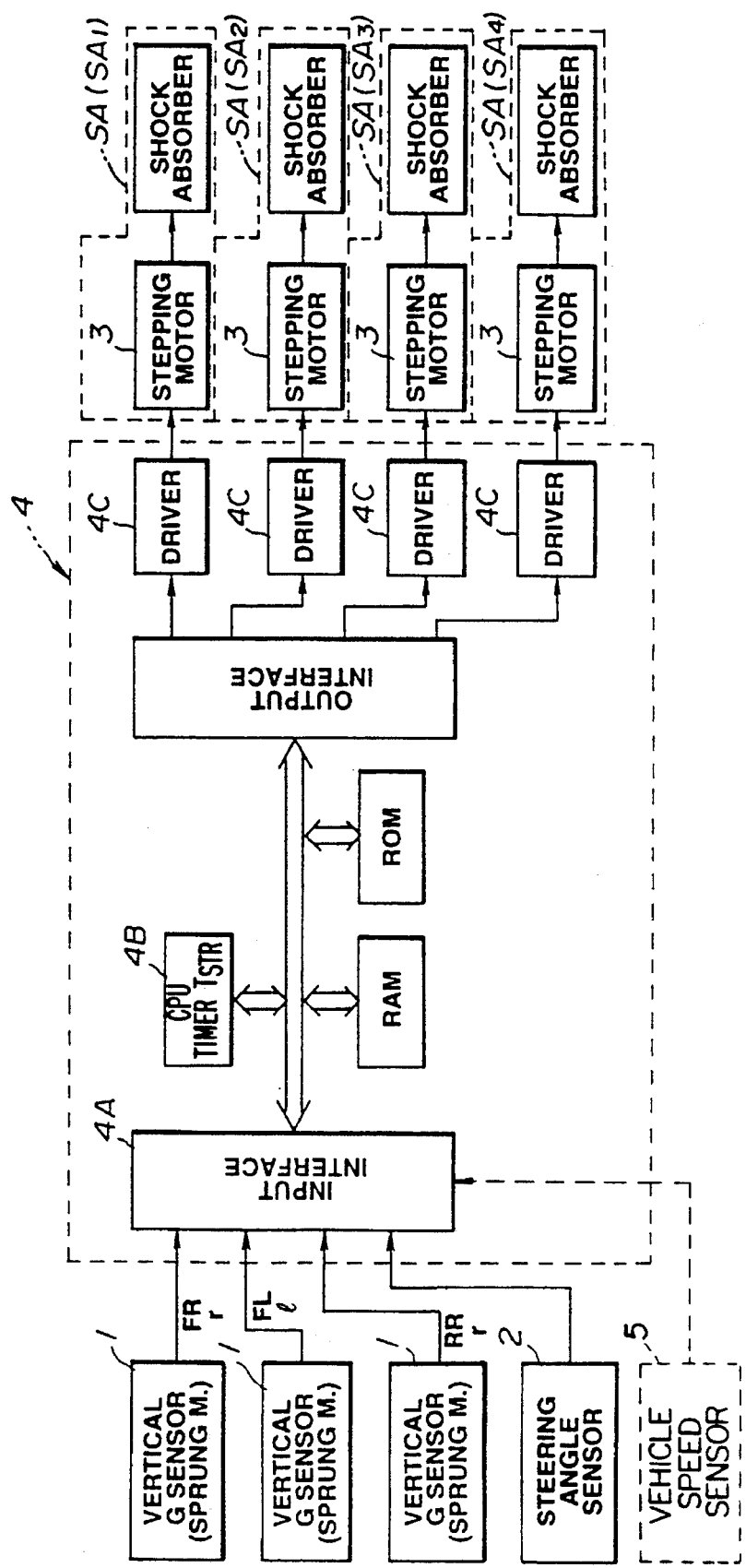
FIG. 2 is a circuit block diagram of the shock absorber damping force controlling apparatus in the first preferred embodiment shown in FIG. 1.

FIG. 1 and 2 show a whole system configuration of a vehicular shock absorber damping force characteristic controlling apparatus in a preferred embodiment according to the present invention.

Four shock absorbers $SA_1$, $SA_2$, $SA_3$, and $SA_4$ (it is noted that a representative shock absorber is simply denoted by SA) are interposed between parts of a vehicle body (sprung mass) and respective tire wheels (unsprung mass). The tire wheels comprise front left tire wheel, front right tire wheel, rear left tire wheel, and rear right tire wheels of the vehicle.

At parts of the vehicle body, all shock absorbers SA ($SA_1$ through $SA_4$) are mounted thereon and in the proximities of the parts of the vehicle body to the corresponding, tire wheels, three vertical sprung mass (vehicle body) acceleration sensors (also called sprung mass G (gravity) sensors) 1, 1, and 1 (hereinafter, one representative sprung mass vertical acceleration sensor is simply denoted by 1) are disposed at the front ,left FL, front right FR, and rear right RR tire wheel vicinities so as to detect the vertical sprung mass (vehicular height direction) accelerations, i.e., vehicle behaviors.

A steering angle sensor 2 which is so constructed as to detect a steered state (steering angle (angular displacement), and steering angular velocity) of a steering wheel is disposed adjacent the steering column of the vehicle.

A control unit 4 is installed at a position of the vehicle body near to the vehicle driver's seat, in response to sensor signals from the respective sensors 1 and 2 and functions to output a drive signal to each pulse (stepping) motor 3 associated with the representative shock absorber SA to be rotated in a desired direction by a desired quantity. A function of each one of the pulse (stepping) motors 3 will be described later.

Figure 4:
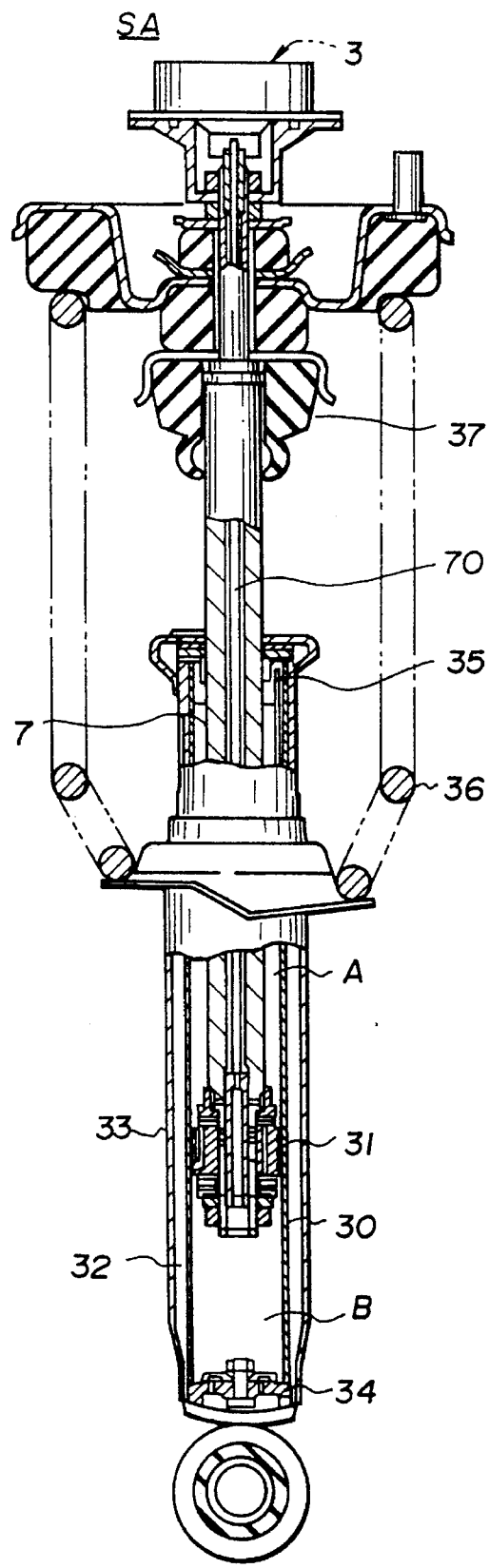
FIG. 4 is a partially sectional view of the representative shock absorber SA used in the embodiment shown in FIGS. 1 and 2.
Figure 5:
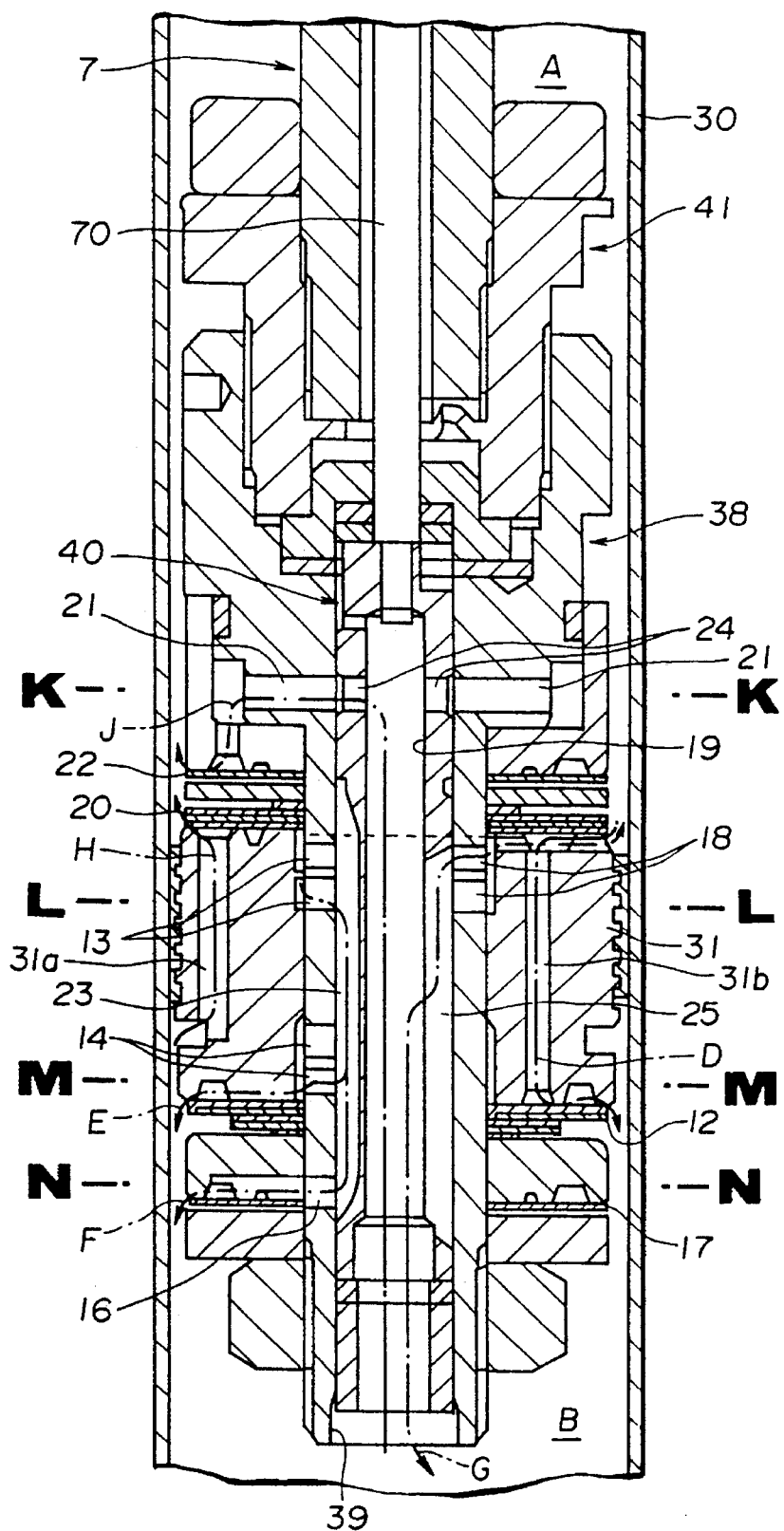
FIG. 5 is an enlarged, partially sectional view of the representative shock absorber SA shown in FIG. 3.

Next, FIGS. 4 and 5 show cross sectional views of each representative shock absorber SA ($SA_1$ through $SA_4$).

The shock absorber SA, as shown in FIG. 4, includes: a cylinder 30, a piston 31 defining an upper portion chamber A and a lower portion chamber B; an outer envelope 33 in which a reservoir chamber 32 is formed on an outer peripheral end of the cylinder 30; a base 34 which defines the lower chamber B and the reservoir chamber 32; guide member 35 which guides a sliding motion of a piston rod 7 with the other end of which a piston 31 is linked; a suspension spring 36 interposed between the outer envelope 33 and vehicle body; and a bumper rubber 37.

Each stepping motor 3 is installed in an upper position of the shock absorber SA so as to operatively rotate an adjuster 40 via a control rod 70 in response to a rotation drive signal from the corresponding one of the drivers (FIG. 2).

FIG. 5 shows an enlarged cross sectional view representing a part of the piston assembly 31 of the respective shock absorbers SA.

As shown in FIG. 5, the piston 31 is formed with penetrating holes 31a and 31b. In addition, the piston 31 is provided with a compression stroke side attenuation valve 20 and an extension stroke side attenuating valve 12 respectively opening and closing the respective penetrating holes 31a and 31b. A stud 38 is spirally meshed with and fixed to a bound stopper 41 spirally meshed with and fixed to a tip end of the piston rod 7. The stud 38 is penetrated through the piston 31. In addition, the stud 38 is formed with a communication hole 39 which communicates the upper portion chamber A and the lower portion chamber B. Furthermore, an adjuster 40 which changes a flow passage cross sectional area of the communication hole 39 is provided in the piston assembly.

Furthermore, an extension stroke side check valve 17 and a compression stroke side check valve 22 are also installed which enable and disable the fluid flow through the communication hole 39 in accordance with the direction of the flow of the fluid. It is noted that the adjuster 40 is rotated via a control rod 70 by means of the pulse motor 3 (referring back to FIG. 2).

It is noted that the stud 38 is formed with a first port 21, a second port 13, a third port 18, a fourth port 14, and fifth port 16, respectively in an upper order.

On the other hand, the adjuster 40 is formed with a hollow portion 19, a first lateral hole 24, and a second lateral hole 25, both lateral holes communicating the internal and external portions of the adjuster 40. A longitudinal groove 28 is formed on an outer peripheral portion. Hence, four flow passages are formed between the upper portion chamber A and lower portion chamber B as the fluid flow passages at the piston extension stroke: that is to say, 1) an extension stroke side first flow passage D such that the fluid passes the penetrating hole 31b, a valve opened internal side of the extension stroke side attenuation valve 12, and reaches the lower portion chamber B; 2) an extension stroke side second flow passage E in which the fluid flows through the second port 13, the longitudinal groove 23, the fourth port 14, a valve opened outer peripheral side of the extension stroke side attenuating valve 12, and reaches the lower portion chamber B; an extension stroke side third flow passage F in which the fluid passes through the second port 13, the longitudinal groove 23, and the fifth port 16; and a bypass flow passage G in which the fluid passes through the third port 18, the second lateral hole 25, and the hollow portion 19 and reaches the lower portion chamber B.

In addition, the fluid flow passage through which the fluid can be caused to flow during the compression stroke side of the piston 31 includes: 1) a compression stroke side first flow passage H in which the fluid flows through the penetrating hole 31a and valve opened compression stroke side attenuating valve 20; 2) a compression stroke side second flow passage J in which the hollow portion 19, the first lateral hole 24, the first port 21, and the opened compression stroke side check valve 22 and reaches the upper portion chamber A; and a bypass passage G in which the fluid flows through the hollow portion 19, the second lateral hole 25, and the third port 18.

Figure 6:
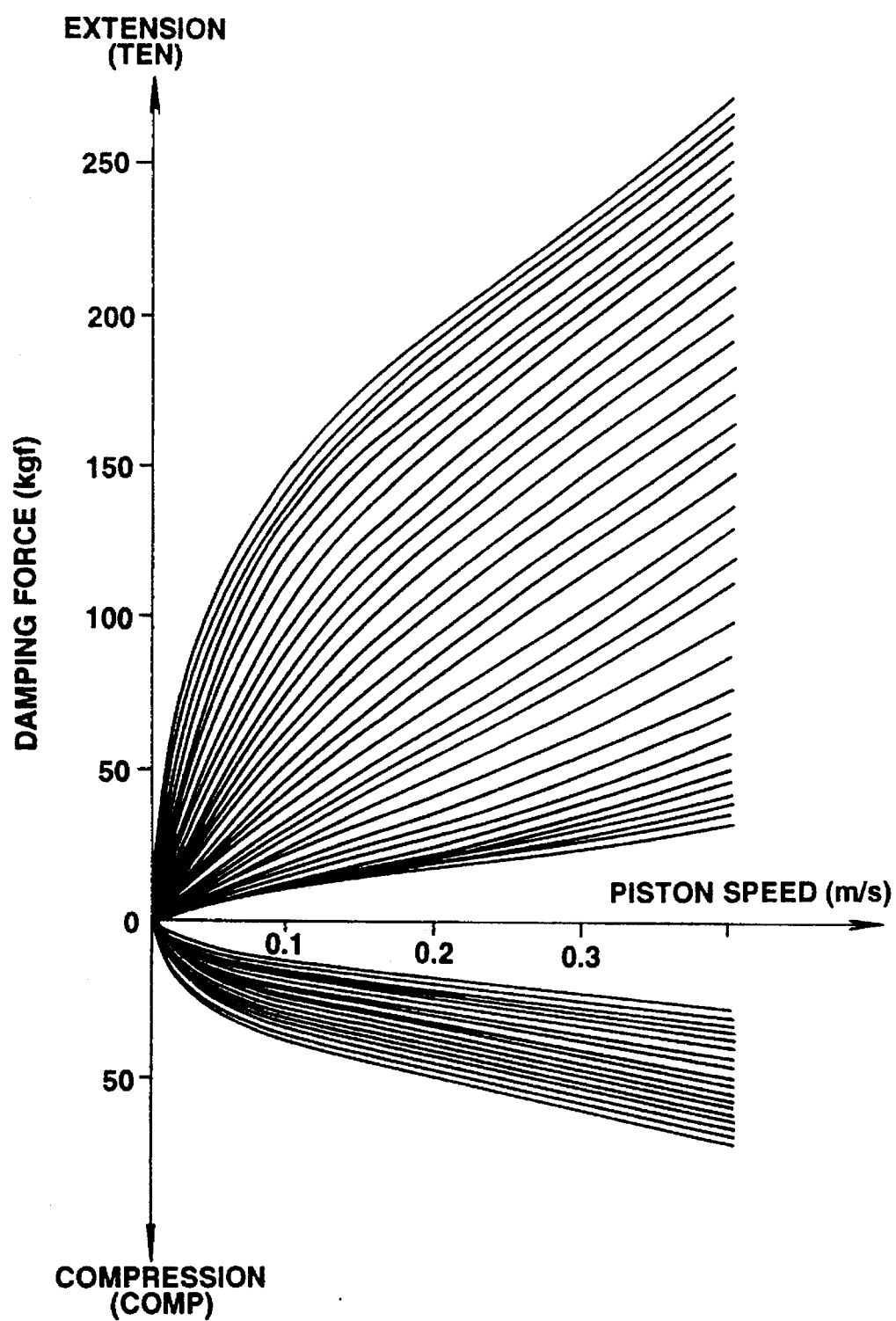
FIG. 6 is a characteristic graph representing damping forces with respect to a piston speed of the representative shock absorber shown in FIGS. 3 and 4.

In summary, the shock absorber SA is so constructed as to be enabled to change the damping force characteristics at a multiple stage in its damping characteristic as shown in FIG. 6 either in the extension stroke side or compression stroke side when the adjuster 40 is pivoted according to the rotation of the stepping motor 3.

It is noted that, as shown in FIG. 6, the damping force characteristic with respect to the piston speed is changed with its gradients being varied.

Figure 7:
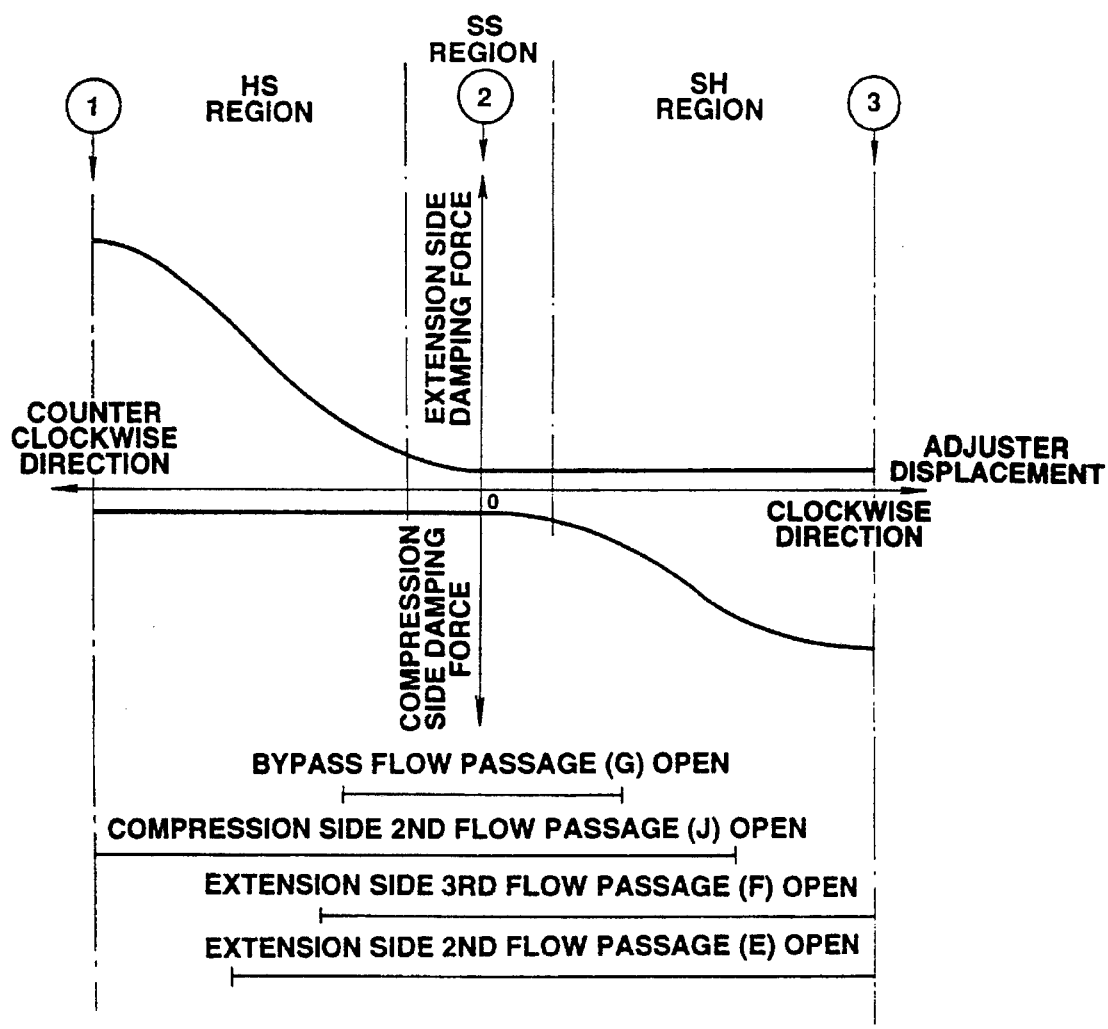
FIG. 7 is a damping coefficient characteristic graph representing a damping force region corresponding to a stepped position of an adjuster according to the rotation of a representative pulse (stepping) motor shown in FIG. 2.
Figure 8A:
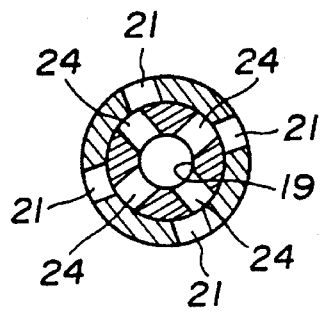
FIGS. 8A, 8B, and 8C are cross sectional views cut away along a line K—K of FIG. 7 representing an essential part of the representative shock absorber shown in FIGS. 3 and 4.
Figure 8B:
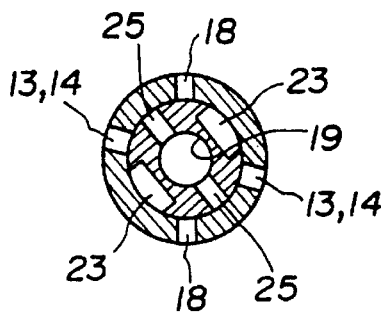
Figure 8C:
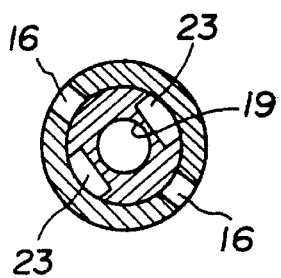
Figure 9A:
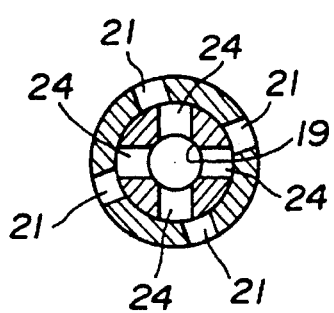
FIGS. 9A, 9B, and 9C are cross sectional views cut away along lines L—L and M—M of FIG. 7 representing an essential part of the representative shock absorber shown in FIGS. 3 and 4.
Figure 9B:
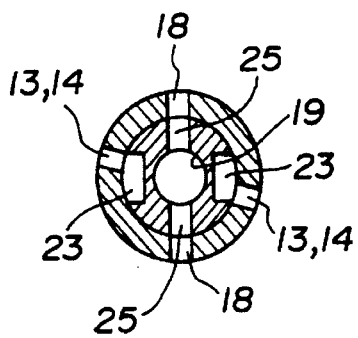
Figure 9C:
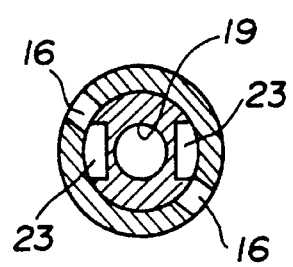
Figure 10A:
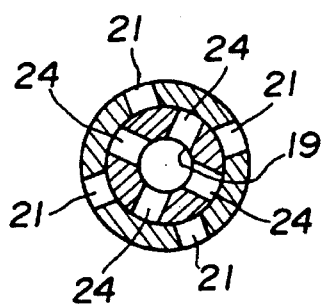
FIGS. 10A, 10B, and 10C are cross sectional views cut away along a line N—N of FIG. 7 representing an essential part of the representative shock absorber shown in FIGS. 4, and 5.
Figure 10B:
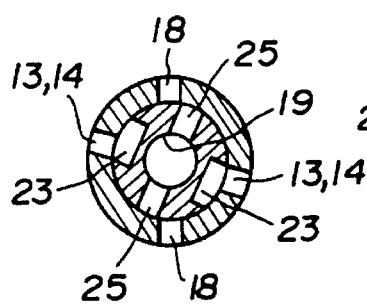
Figure 10C:
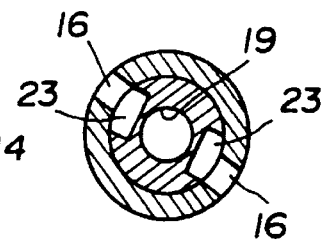

In detail, as shown in FIG. 7, when the adjuster 40 is pivoted in the counterclockwise direction from a position at which both of the extension and compression stroke sides are in the soft positions (hereinafter, referred to as a soft position SS) the damping coefficient at the extension stroke side can be changed at the multiple stages but the compression stroke side is fixed at the soft region (hereinafter, referred to as an extension stroke side hard region HS). On the contrary, when the adjuster 40 is pivoted in the clockwise direction therefrom, the damping coefficient at the compression stroke region can be changed to the hard region at the multiple stages but the extension stroke side is fixed to the soft region (hereinafter, referred to as a compression hard region SH).

Figure 11:
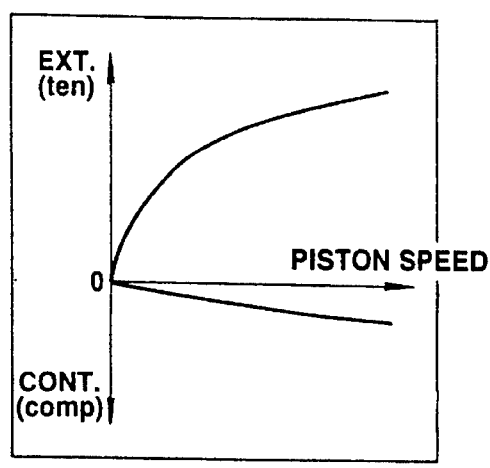
FIG. 11 is a damping force characteristic graph when an extension stroke side with respect to the piston of the representative shock absorber shown in FIG. 4.
Figure 12:
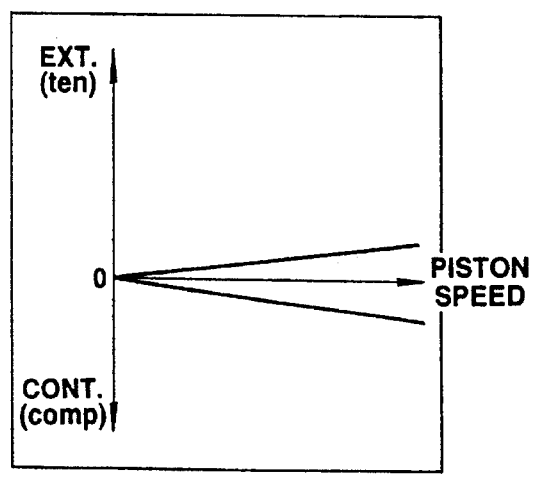
FIG. 12 is a damping force characteristic graph when both extension and compression stroke sides are in soft damping force states.
Figure 13:
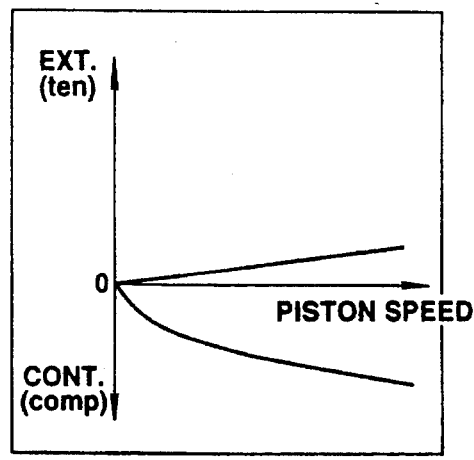
FIG. 13 is a damping force characteristic graph when the compression stroke side is in a hard damping force state.

When, as shown in FIG. 7, the adjuster 40 is pivoted at any one of positions ①, ②, and ③, cross sections of the piston assembly portions cut away along lines K—K, L—L, M—M, and N—N of FIG. 5 are respectively shown in FIGS. 8A, 8B, 8C, 9A, 9B, 9C, 10A, 10B, and 10C, respectively. The damping force characteristics at the respective positions ①, ②, and ③ are shown in FIGS. 11, 12, and 13.

Figure 3:
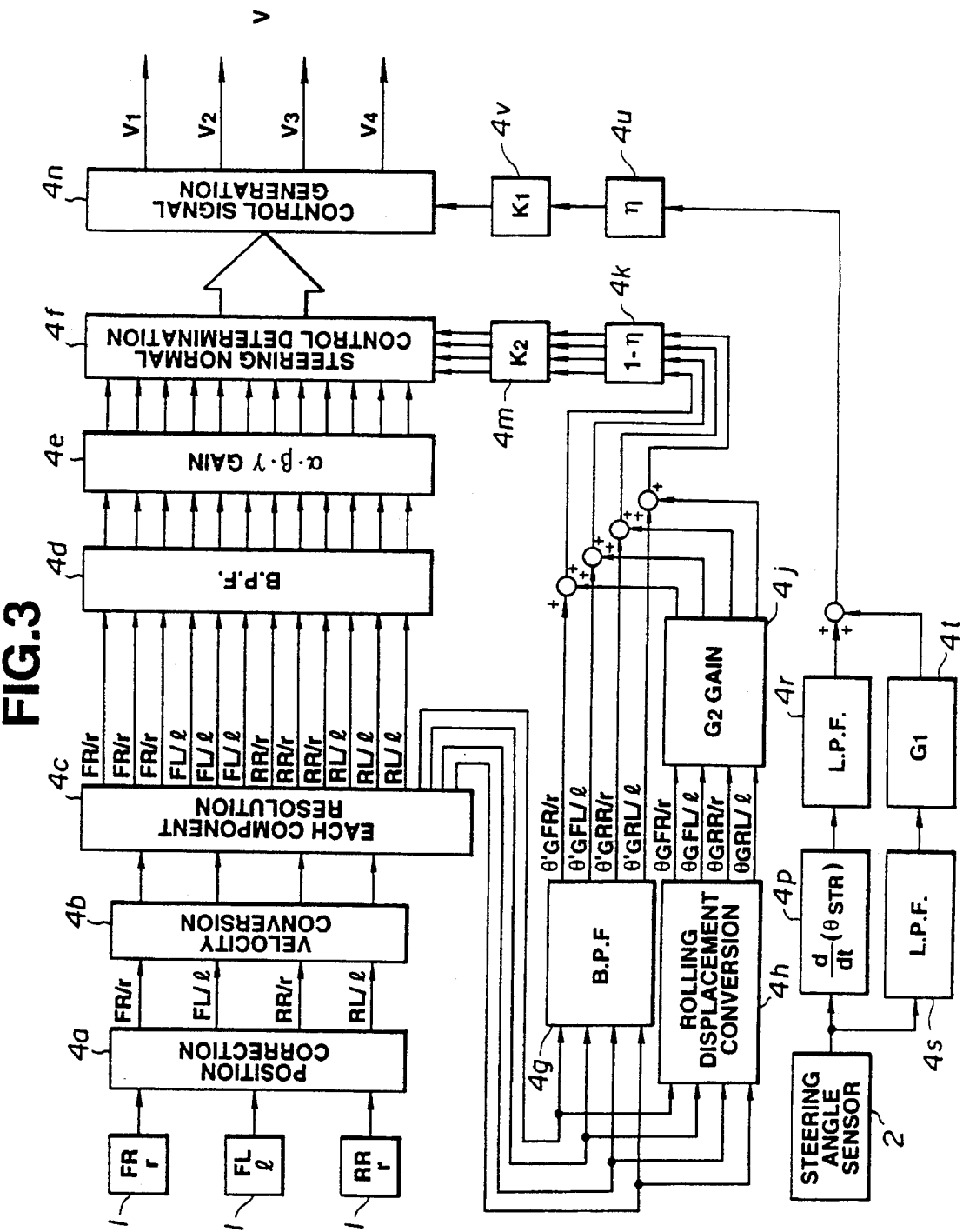
FIG. 3 is a circuit block diagram of a control unit of the shock absorber damping force controlling apparatus shown in FIG. 2.

FIG. 3 shows a circuit block diagram of a signal processing circuit in the control unit 4 (FIG. 2) to generate the control signal.

Each vertical G sensor 1, 1, and 1 outputs the vertical sprung mass acceleration signals $FR_r$, $FL_t$, and $RR_r$ to a position correction section 4a. The position correction section 4a corrects the respective vertical sprung mass acceleration signals to those of the respective tire wheel portions, i.e., front left tire wheel, front right tire wheel, rear left tire wheel, and rear right tire wheel. as FL/l, FR/r, RL/l, and RR/r.

A velocity conversion section 4b has a low pass filter having a cut-off frequency of 0.05 Hz and serves as an integrator to derive corresponding four vertical sprung mass velocity signals on the basis of the corrected vertical sprung mass acceleration signals. Each component resolution section 4c serves to derive bouncing components in proximities to the respective shock absorbers (vertical sprung mass velocities), a pitching component (a difference between both vertical sprung mass velocities in tile forward/rearward direction of the vehicle), and a rolling component (a difference between both vertical sprung mass velocities in a vehicle width direction).

A BPF (Band Pass Filter) 4d serves to derive the respective bouncing component signals which fall in a predetermined frequency region including a sprung mass resonant frequency ($VB_1$, $VB_2$, $VB_3$, $VB_4$, each subscript, 1, 2, 3, and 4 corresponds to the position (front right, front left, rear right, rear left) of the corresponding one of the shock absorbers SA shown in FIG. 1, derive pitch component signals VP ($VP_1$, $VP_2$, $VP_3$, $VP_4$) which fall in a predetermined frequency range including a pitch resonant frequency, and derive rolling component signals VR ($VR_1$, $VR_2$, $VR_3$, $VR_4$) which fall in a predetermined frequency range including a rolling resonant frequency. Especially, the BPF to derive the rolling component signal VR includes a high pass filter (HPF) having a cut-off frequency of 0.1 Hz and a low pass filter (LPF) having a cut-off frequency of 3.0 Hz.

The subsequent gain setting section 4e serves to multiply the bouncing component signal VB, the pitch component signal VP, and rolling component signal VR by each control gain $\alpha$, $\beta$, and $\gamma$ and outputs a bounce rate signal ($\alpha \cdot VB$), a pitch rate signal ($\beta \cdot VP$), and a roll rate signal ($\gamma \cdot VR$) to the subsequent steering normal control determination section 4f.

On the other hand, each roll component derived in the component resolution section 4c is sent to another BPF 4g for processing the rolling component. The BPF 4g derives rolling component signals $\theta'_G$ which falls in a frequency range including a rolling resonant frequency, and derives a displacement signal ($G_2 \cdot \theta_G$) by multiplying a rolling angle gain $G_2$ by a rolling displacement signal $\theta_G$ passed through a rolling angular displacement conversion part 4h and $G_2$ gain setting section 4j, both installed in parallel to the BPF 4g.

The next rate distribution setting section 4k is input depending upon a state of signal ($\theta'_G + G_2 \cdot \theta_G$) which is the addition of both of the rolling component signal $\theta_G$ and the displacement signal $G_2 \cdot \theta_G$. The rate of synthesis signal is processed by means of the rate distribution Setting section 4k to provide a signal value $(|1-\eta|(\theta'_G + G_2 \cdot \theta_G)$ according to a set rate of distribution. The next $K_2$ gain setting section 4m receives the above-provided signal of the steering normal control determination section 4f and multiplies it by a gain of $K_2$ (constant) to provide a rolling rate signal during the steering operation denoted by $(K_2(1-\eta)(\theta'_G + G_2 \cdot \theta_G))$ for the steering normal control determination section 4f. A low pass filter having a cut off frequency of 0.1 Hz is used for the rolling displacement conversion section 4h. The rolling processing band pass filter 4g includes a high pass filter having a cut off frequency of 0.3 Hz and a low pass filter having a cut off frequency of 3.0 Hz.

The steering normal control determination section 4f carries out a selection processing of the signals output to the next control signal processing section 4n from among the input respective signals thereof on the basis of a determination whether a steering operation is carried out.

In detail, during the determination that the steering operation, for example, from a neutral point of the steering wheel system of the vehicle is carried out, all of the bounce rate signal, pitch rate signal, and roll rate signal ($\alpha \cdot VB$, $\beta \cdot VP$, and $\gamma \cdot VR$) are output therefrom. In addition, during the determination that the steering operation is carried out, the steering roll rate signal denoted by $(K_2(1-\eta)(\theta'_G + G_2 \cdot \theta_G))$ is output in place of the bounce rate signal, the pitch rate signal ($\alpha \cdot VB$ and $\beta \cdot VP$) and, in addition, the roll rate signal ($\gamma \cdot VR$).

It is noted that the determination of whether the steering operation is carried out and requires the damping force characteristic control is based on a vehicle speed signal, the steering angle, and the steering angular velocity signal.

Figure 14:
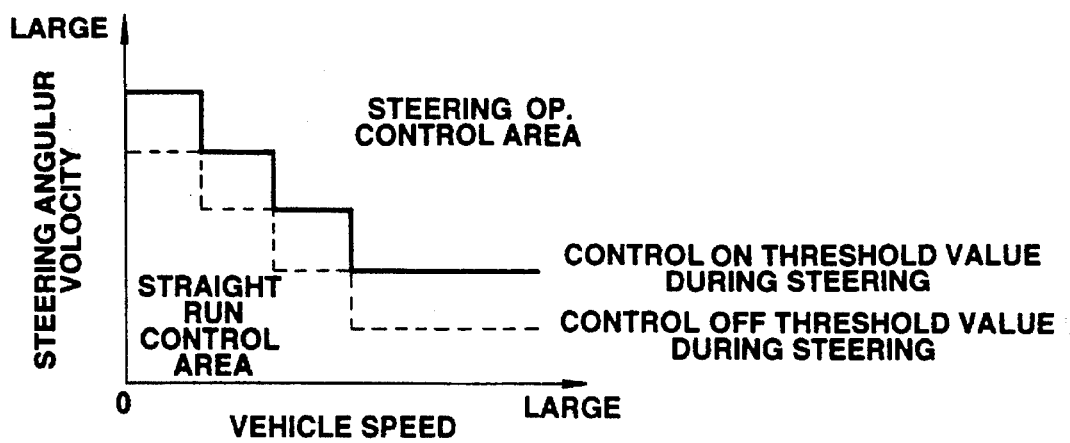
FIG. 14 is a map representing a variation in a control ON threshold value and a control OFF threshold value during a steering operation at a steering angular velocity with respect to a vehicle speed.

FIG. 14 shows a variable characteristic map representing a control ON threshold value (solid line) of the steering angular velocity with respect to a vehicle speed and a control OFF threshold value (broken line) of the steering angular velocity with respect to the vehicle speed.

Figure 15:
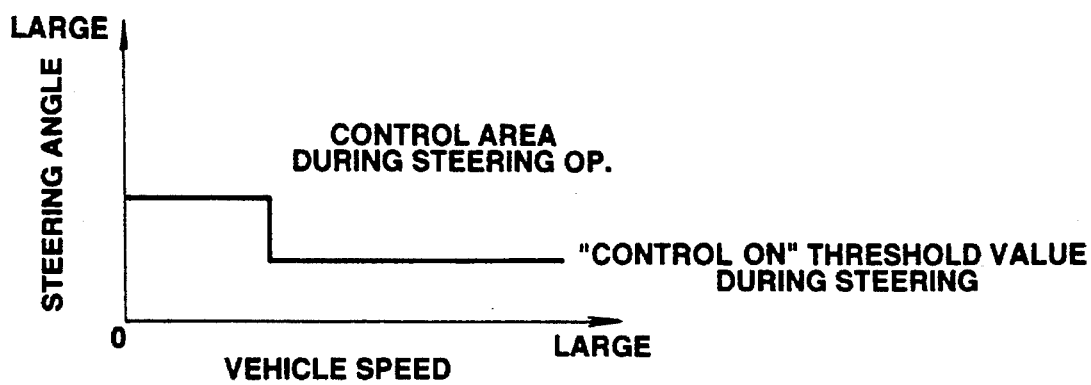
FIG. 15 is a map representing a variation characteristic of the control ON threshold value during the steering operation at a steering angle with respect to the vehicle speed.

In, addition, FIG. 15 shows a variable characteristic map representing the control ON threshold value of the steering angle with respect to the steering angle.

On the basis of both maps shown in FIGS. 14 and 15, the control during the steering operation is turned to ON when both steering angular velocity and steering angle exceed their respective control ON threshold values during the steering operation. Thereafter, when a time duration while the steering angular velocity is below the control OFF threshold value during the steering operation exceeds a predetermined timer set time value $T_{STR}$ (ms), a switching control such that the control during the steering operation is turned to OFF and returned to a non-steering controlled state is started. It is noted that, since the rolling quantity based on the steering operation becomes larger in proportion to the vehicle speed, although the steering displacement is less, both control ON and OFF threshold values during the steering operation are reduced in a stepwise manner as the vehicle speed becomes higher.

Referring back to FIG. 3, the steering angular displacement signal $\theta_{STR}$ from the steering angle sensor 2 is converted into the steering angular velocity $\theta'_{STR}$ at a velocity conversion section 4p. Thereafter, the velocity converted signal is passed through a steering angular velocity signal processing low pass filter 4r to cut off a high frequency region exceeding 0.8 Hz inclusive. In addition, the steering angular displacement signal is also passed through a steering angle signal processing low pass filter 4s and $G_1$ gain setting section 4t to derive a signal denoted by $G_1 \cdot \theta_{STR}$. The signal of $G_1 \cdot \theta_{STR}$ is a signal in which the steering angular displacement signal $\theta_{STR}$ multiplied by a steering angle gain $G_1$. A signal indicating the addition of both steering angular velocity signal $\theta'_{STR}$ and signal of $G_1 \cdot \theta_{STR}$ is input to a rate distribution setting section 4u. The rate distribution setting section 4u processes as follows: a signal value $(\eta(\theta'_{STR} + G_1 \cdot \theta_{STR})$ which is in accordance with a rate distribution gain ($\eta$) and the roll rate signal ($K_1 \cdot \eta(\theta_{STR} + G_1 \cdot \theta_{STR})$) during no steering operation is input to the control signal preparing section 4n from a gain setting section 4v of $K_1$ (constant).

Then, the control signal preparing section 4n derives the control signal V ($V_1$, $V_2$, $V_3$, and $V_4$) indicating the addition of the input signal from the $K_1$ gain setting section 4v and the input signal from the steering normal control determining section 4f as shown in the following equations. The damping force characteristic controls of the respective shock absorbers SA ($SA_1$, $SA_2$, $SA_3$, and $SA_4$) are controlled on the basis of the corresponding derived control signals V. It is noted that the respective control signal V ($V_1$, $V_2$, $V_3$, and $V_4$) indicate positive values when the corresponding vertical sprung mass accelerations are upward and indicate negative values when they are downward.

(1) Calculation formula during no steering operation:

$$V = \alpha \cdot VB + \beta \cdot VP + \gamma \cdot VR + K_1 \cdot \eta(\theta'_{STR} + G_1 \cdot \theta_{STR}).$$

(2) Calculation formula during the steering operation:

$$V = \alpha \cdot VB + \beta \cdot VP + K_2(1-\eta)(\theta'_G + G_2 \cdot \theta_G) + k_1 \cdot \eta(\theta'_{STR} + G_1 \cdot \theta_{STR}).$$

Both of the rate distribution setting sections 4k and 4u receives the vehicle speed signal from the vehicle speed, sensor 5 (FIG. 2).

Figure 16:
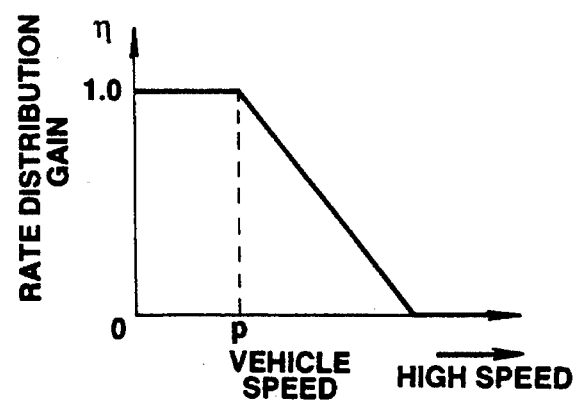
FIG. 16 is a map representing a variation characteristic of a distribution gain with respect to the vehicle speed.

As shown in FIG. 16, the value of the rate distribution (mixed gain) gain denoted by $\eta$, which determines the rate percentage in the respective rate distribution setting sections 4k and 4u, is variably set according to the value of the vehicle speed.

In detail, as shown in FIG. 16, when the vehicle speed falls in a relatively low speed range, for example, up to a predetermined speed (20 Km/h), the roll rate signal during the steering operation ($K_2(1-\eta)(\theta'_G + G_2 \cdot \theta_G)$) is zero and the addition rate of the roll rate signal during the no steering operation $K_1 \cdot \eta(\theta'_{STR} + G_1 \cdot \theta_{STR})$ is maximized. On the other hand, when the vehicle speed exceeds the above-described low speed range P, the value of the rate distribution gain $\eta$ becomes less as the vehicle speed is increased.

Hence, as the vehicle speed is increased as shown in FIG. 16, the addition rate of the roll rate signal during no steering operation ($K_1 \cdot \eta(\theta'_{STR}+G_1 \cdot \theta_{STR})$) is reduced and, while, the addition rate of the roll rate signal during the steering operation $K_2(1-\eta)(\theta'_G+G_2 \cdot \theta_G)$ is increased.

Next, a control procedure of the control unit 4 to control the drive of the stepping motor 3 on the basis of the control signal V will be described below with reference to a flowchart shown in FIG. 17.

Figure 17:
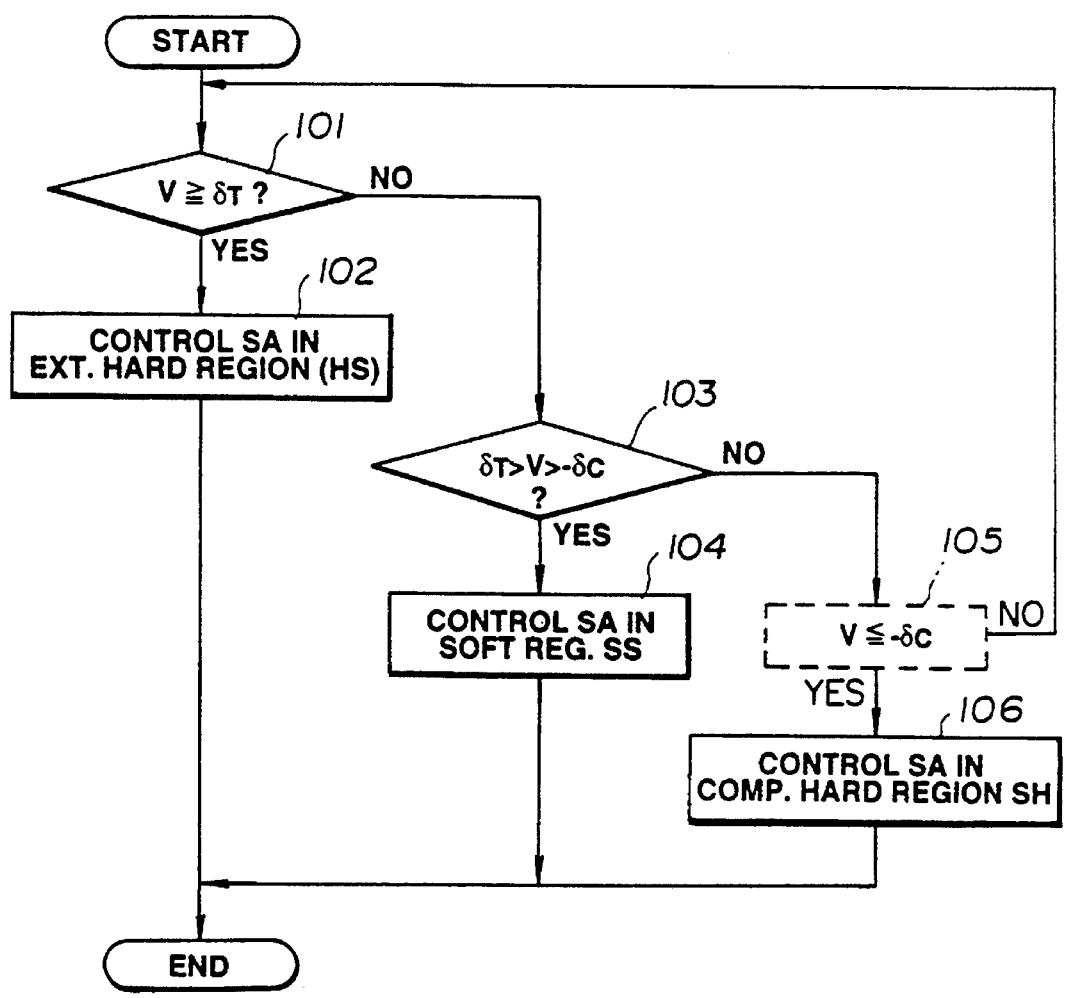
FIG. 17 is an operational flowchart of a damping force characteristic control operation in the control unit shown in FIG. 2.

This control routine shown in FIG. 17 is executed for each shock absorber SA.

In FIG. 17, the CPU (FIG. 2) determines whether the control signal V is equal to or above a predetermined positive threshold value $\delta_T$ defining a dead zone therein. If YES at the step 101, the routine goes to a step 102, in which the CPU 4B issues a command toward a corresponding driver (FIG. 2) so that the shock absorber SA falls in the extension stroke side hard region (HS).

If NO at the step 101, the routine goes to a step 103 in which the CPU determines whether the control signal falls in the dead zone between $\delta_T$ and $-\delta_T$. If YES, i.e., $\delta_T > V > -\delta_C$ at the step 103, the routine goes to a step 104 in which the CPU issues a command toward the corresponding driver 4C so that the shock absorber SA falls in the extension and compression stroke sides soft regions (SS). If NO at the step 103, the routine goes to a step 105 in which the CPU 4B determines whether $V \leq -\delta_C$. If YES at the step 105, the routine goes to a step 106 in which the CPU 4B issues the command toward the driver 4C to pivot the adjuster so that the shock absorber SA falls in the compression stroke side hard region (SH).

Next, the operation of the damping force characteristic control based on the flowchart shown in FIG. 17 will be explained below with reference to waveform timing charts of FIGS. 18A through 18D.

Figures 18A, 18B, 18C, 18D:
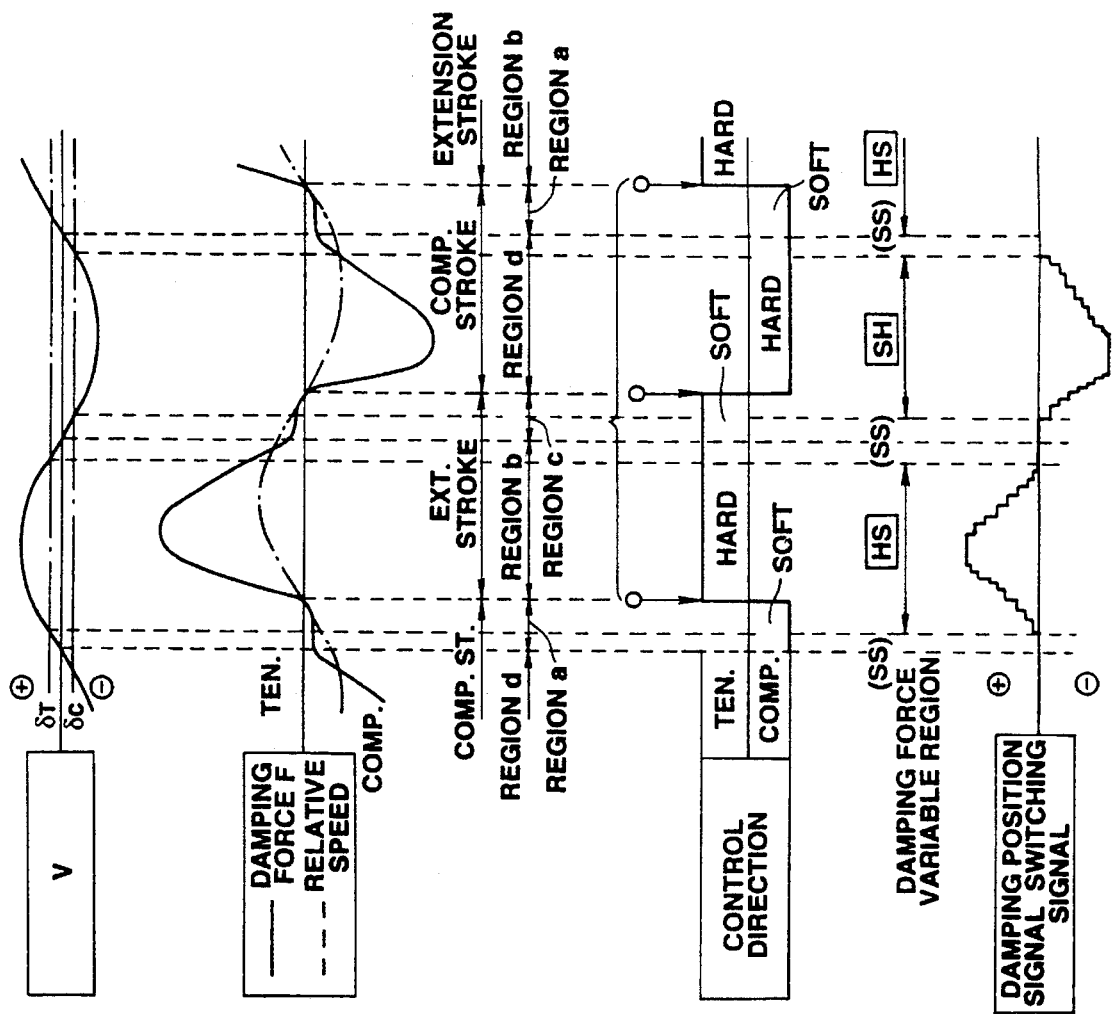
FIGS. 18A, 18B, 18C, and 18D are waveform timing charts of the damping force characteristic control operation in the control unit shown in FIG. 2.

In a case where the control signal V based on the vertical sprung mass velocity is changed in the way shown in FIG. 18A, the shock absorber SA falls in the soft regions (SS) at both extension and compression stroke sides if the control signal V falls in the dead zone between $\delta_T$ and $-\delta_C$.

If the control signal V equals or above the positive predetermined threshold value $\delta_T$, the shock absorber SA is controlled at the extension stroke hard region HS and the compression stroke side is fixed at the low damping force characteristic. In addition, the damping force characteristic at the extension stroke side is varied in proportion to the control signal V.

If the control signal V is below the predetermined negative threshold value $\delta_C$, the shock absorber SA falls in the compression stroke side hard region (SH), i.e., the extension stroke side is fixed at the low damping force characteristic and the damping force characteristic at the compression stroke side is varied in proportion to the control signal V.

In FIG. 18B, a region a denotes a state wherein the control signal based on the vertical sprung mass velocity is reversed from the negative value (downward) to the positive value (upward). At this region a, the relative velocity between the sprung mass and unsprung mass is still negative (the stroke direction at this region a is the compression stroke). Therefore, at this time, the shock absorber SA is controlled at the extension stroke side hard region (HS) on the basis of the direction of the control signal V. Hence, the compression stroke falls in the soft damping force characteristic which is, at this time, the stroke direction of the shock absorber SA.

In FIG. 18B, a region b denotes a region in which the control signal V based on the vertical sprung mass velocity is still positive (upward) and the relative velocity described above is changed from the negative value to the positive value (the stroke direction of the shock absorber SA is at the extension stroke side). At this time, since the shock absorber SA is controlled in the extension stroke side hard region (HS) on the basis of the direction of the control signal V and the stroke direction is at the extension stroke, the extension stroke side of the shock absorber at this region b provides the hard damping force characteristic in proportion to the value of the control signal V.

In addition, in FIG. 18B, a region c is a region in which the control signal based on the vertical sprung mass velocity is changed from the positive value (upward) to the negative value (downward) and the relative velocity still provides the positive value (extension stroke is the stroke direction of the shock absorber SA). At this region c, the shock absorber is controlled as the compression stroke side hard region (SH) on the basis of the direction of the control signal V. Hence, the extension stroke which is the stroke direction at this region c provides the soft damping force characteristic.

In addition, in FIG. 18B, a region d is a region wherein the control signal V based on the vertical sprung mass velocity is still in the negative value (downward) and the relative velocity described above is still the positive value (the stroke direction of the shock absorber SA is at the extension stroke side). At this time, the shock absorber SA is controlled at the compression stroke hard region SH on the basis of the direction of the control signal V and the stroke direction of the shock absorber SA is at the compression stroke side. Hence, at this region d, the compression stroke side provides the hard damping force characteristic in proportion to the value of the control signal V.

As described above, in the embodiment, when the directions of both vertical sprung mass velocity and relative velocity are the same (region b and region d), the stroke direction of the shock absorber, at this time, provides the hard damping force characteristic. On the other hand, when the directions described above indicate different signs (region a and region c), the stroke direction of the shock absorber SA is controlled in the soft characteristic. The same control as the damping force characteristic control based on the sky hook theory can be achieved without detection of the relative velocity between the sprung mass and unsprung mass. Furthermore, in the embodiment, when the region is transferred from the region a to the region b and from the region c to the region d, the switching of the damping force characteristic can be achieved without drive(s) of the stepping motor(s) 3.

Next, the operations of the control unit 4 during the vehicular straight run and during the steering operation will be described below.

(A) When the vehicle runs on the straight road without the steering angular displacement:

When the vehicle runs on the straight road, the steering angular displacement and steering angular velocity detected by the steering angle sensor 2 are respectively below the control ON threshold value during the steering operation. At this time, the damping force characteristic control by means of the control signal V derived on the basis of the above-described calculation formula during no steering operation of the item (1).

That is to say, in the state wherein the vehicle is in a completely straight running condition, the roll rate signal during no steering operation in the calculation formula (1) expressed as ($K_1 \cdot \eta(\theta'_{STR}+G_1 \cdot \theta_{STR})$) gives zero. Therefore, the control signal V is derived on the basis of the bounce rate signal β·VB, the pitch rate, signal. β·VP, and roll rate signal γ·VR. Thus, a sufficient control force against the vehicular bouncing, pitching, and vehicular rolling generated due to the road surface vibration input can be generated.

In addition, when the steering operation is carried out in a range such that at least one of either the steering angular displacement signal or the steering angular velocity signal does not exceed the corresponding control ON threshold value during the steering operation, the control during the steering operation is not carried out. However, since the value of the rolling rate signal during no steering operation $(K_1 \cdot \eta (\theta'_{STR} + G_1 \cdot \theta_{STR}))$ is increased, the vehicular rolling based on the steering operation can be suppressed.

Furthermore, even when, in the vehicular straight running condition, the detected value of the steering angular velocity exceeds the control ON threshold value during the steering operation due to vehicular body fluctuations based on a shimmy phenomenon and/or based on a kick back phenomenon when any one of the tire wheels has passed a kind of stone, the switching to the control during the steering operation is not carried out unless the detected value of the steering angular displacement signal simultaneously exceeds the control ON threshold value during the steering operation.

(B) When the vehicle driver steers the vehicle through the steering wheel system:

When the vehicle driver steers by predetermined operating variables and both of the steering angular displacement signal and the steering angular velocity signal exceed the control ON threshold values shown in FIG. 14, the switching of the control to the control during the steering operation on the basis of the control signal V derived on the basis of the calculation formula during the steering operation of the item (2) is, in turn, carried out. That is to say, the rolling rate signal during the steering operation $(K_1 \cdot (1-\eta)(\theta'_G + G_2 \cdot \theta_G))$ is newly added to the control signal V in place of the rolling rate signal $\gamma \cdot VR$ in the calculation formula during no steering operation of the item (1). The addition rate of the rolling rate signal during the steering operation and during no steering operation $(K_1 \cdot (1-\eta)(\theta'_G + G_2 \cdot_G))$ is varied according to the value of the rate distribution gain β varied depending upon the vehicle speed.

That is to say, as shown in FIG. 16, while the vehicle speed falls in the range from zero to the predetermined low speed range limit P, the rate distribution gain β is set to 1.0, the rolling rate signal during the steering operation $(K_2(1-\eta)(\theta'_G + G_2 \cdot \theta_G))$ indicates zero, and the addition rate of the rolling rate signal during no steering operation $(K_1 \cdot \eta (\theta'_{STR} + G_1 \cdot \theta_{STR}))$ is maximized. Thus, the value of the control signal. V is increased according to the increases in the respective steering angular displacement and steering angular velocity. Consequently, the vehicular rolling generated on the basis of the steering operation can sufficiently be suppressed according to the weighted damping force characteristic(s) of the shock absorber(s) SA.

On the other hand, when the vehicle speed exceeds the predetermined low speed range limit P shown in FIG. 16, the value of the rate distribution gain η becomes lower in an inverse proportion to the increased vehicle speed. Hence, as the vehicle speed increases, the addition rate of the rolling rate signal during no steering operation $((K_1 \cdot \eta (\theta'_{STR} + G_1 \cdot \theta_{STR}))$ is reduced and the addition rate of the rolling rate signal during the steering operation $(K_2 \cdot (1-\eta)(\theta'_G + G_2 \cdot \theta_G))$ is increased. That is to say, as the rolling quantity generated on the vehicle is increased, the value of the control signal V is increased. Consequently, the vehicular rolling generated on the basis of the steering operation can sufficiently be suppressed according to the weighted damping force characteristic(s).

(C) When the vehicle turns in a steady state cornering mode:

After the steering operation is carried out, the vehicle turns in a steady-state cornering mode. At this time, the steering angular displacement remains exceeding the control ON threshold value during the steering operation but the steering angular velocity becomes below the control OFF threshold value during the steering operation. In this situation, the control switching is carried out from the control during the steering operation to that during no steering operation when the time has passed by the predetermined timer time $T_{STR}$ (ms). In addition, in a case where the steering angular velocity is below a predetermined quantity (for example, 40 deg/sec.) within a predetermined time (for example, 100 ms), the steering angular displacement is updated to zero and the control is switched to that during no steering operation.

That is to say, in the steady-state cornering condition, the values of the steering angular velocity $\theta_{STR}$ and steering angle $\theta_{STR}$ give zeroes from the value of the rolling rate signal during no steering operation $(K_1 \cdot \eta (\theta'_{STR} + G_1 \cdot \theta_{STR}))$ in the calculation formula during no steering operation of the item (1). During a steady-state rolling motion generated on the basis of the steering operation, the bouncing control, pitch control, and rolling control are carried out with respect to the road surface vibration input on the basis of the sky hook theory so that a worsening of the vehicular comfort during the steady-state cornering condition can be prevented.

As described above, since the damping force characteristic controlling apparatus in the embodiment can generated a sufficient control force against the bouncing motion, pitching motion, and rolling motion of the vehicle, the vehicular comfort and steering stability can be assured during the vehicle straight running.

The vehicular rolling motion during the steering operation can be suppressed according to the damping force characteristic(s) weighted according to the vehicular rolling and rolling displacement. Thus, the steering stability during the vehicular steered state can be enhanced without sacrifice of vehicular comfort during the vehicular straight running.

Since the control ON condition during the steering operation is such as to be AND condition of the steering angular velocity and steering angular displacement, even when the detected value of the steering angular at velocity exceeds the control ON threshold value due to the steering wheel fluctuations caused by the shimmy phenomenon and/or due to the kick back phenomenon when any one of the tire wheels has passed a stone or other obstacles, the switching of control to the control during the steering operation is not carried out unless the steering operation by the vehicle driver is not carried out. Consequently, the worsening of the vehicular comfort due to the erroneous operation of the control unit 4 can be prevented.

Since the control OFF condition during the steering operation is only related to the steering angular velocity, the worsening of the vehicle comfort during the vehicular steady-state cornering condition can be prevented.

The weighted addition based on the steering angular displacement and steering angular velocity is included in the calculation formulae (1) and (2) during the steering operation and during no steering operation which derives the control signal V. Thus, an abrupt change in the damping force characteristic during the switching to the control during the steering operation can be eliminated so that this switching can smoothly be carried out.

As compared with the previously proposed damping force characteristic control based on the sky hook theory, a frequency of changing the damping force characteristic from the soft one to the hard one and vice versa can be reduced. Thus, the control response characteristic can be enhanced. The durability of the steering motor(s) 3 can accordingly be improved.

The specific structure of the apparatus for controlling the damping force characteristic of each shock absorber is not limited to the above-described embodiment.

For example, although in the embodiment three vertical G sensors 1, 1, and 1 are used, four vertical G sensors installed near to the respective four shock absorbers SA ($SA_1$, $SA_2$, $SA_3$, and $SA_4$) may be used.

In addition, in order to the suppression control of the bouncing motion and rolling motion, a pair of the vertical G sensors may be installed at positions near to front (rear) right and front (rear) left shock absorbers SA ($SA_1$ and $SA_2$ or $SA_3$ and $SA_4$).

The structure of the shock absorbers SA may alternatively be such that the damping force characteristics at both extension and compression stroke sides are changed simultaneously.

Various types of embodiments and modifications can be made within the scope of the present invention which will be defined by the appended claims.

What is claimed is:

1. An apparatus for an automotive vehicle comprising:
   a) a plurality of shock absorbers, each shock absorber being interposed between a sprung mass and an unsprung mass and having damping force characteristic changing means for operatively setting a damping force characteristic at either of extension or compression stroke side with respect to a piston of the shock absorber to a desired damping force characteristic in response to a drive signal input thereto;
   b) vertical sprung mass acceleration detecting means for detecting vertical accelerations of the sprung mass at at least right and left positions of a vehicle body with respect to a vehicular forward direction and outputting vertical acceleration signals indicative thereof;
   c) vertical sprung mass velocity determining means for determining vertical sprung mass velocity signals corresponding to a position of each of the shock absorbers on the basis of the respective vertical sprung mass acceleration signals;
   d) steering state detecting means for detecting a steering angular displacement and a steering angular velocity from a vehicular steering system and outputting signals indicative thereof;
   e) controlling means for controlling the damping force characteristic of each of the shock absorbers on the basis of a control signal, said control signal being a synthesization of a bouncing rate signal calculated on the basis of the vertical sprung mass velocity signal corresponding to each shock absorber position and a control gain, a rolling rate signal calculated on the basis of a difference between the vertical sprung mass velocity signals for left and right portions of the vehicle body, a rolling angular displacement signal calculated on the basis of the vertical sprung mass velocity signals for the left and right portions of the vehicle body and a rolling angular gain, the steering angular displacement signal, and the steering angular velocity signal, said controlling means synthesizing said control signal at a predetermined rate of synthesis and converting said control signal into the drive signal; and
   f) rate of synthesis setting means for variably setting the predetermined rate of synthesis according to the steering angular velocity signal and steering angular displacement signal.

2. An apparatus for an automotive vehicle as set forth in claim 1, which further comprises an additional vertical sprung mass acceleration detecting means, installed on either front or rear position of the vehicle body with respect to a vehicular forward/rearward direction in proximity to a corresponding one of the shock absorbers, for detecting another vertical sprung mass acceleration and outputting another vertical sprung mass acceleration signal indicative thereof, and wherein said additional vertical sprung mass velocity determining means determines another vertical sprung mass velocity signal in addition to the previously determined vertical sprung mass velocity signals, and said controlling means further derives a pitch rate signal on the basis of the vertical sprung mass velocity signals related to the vehicular forward/rearward direction, said control signal being generated on the basis of the pitch rate signal in addition to the bounce rate signal, roll rate signal, roll angular signal, the steering angular displacement signal and the steering angular velocity signal.

3. An apparatus for an automotive vehicle as set forth in claim 2, which further comprises a vehicle speed sensor for detecting a vehicle speed and outputting a vehicle speed signal indicative thereof, and a predetermined rate distribution gain setting means for setting a predetermined rate distribution gain ($\eta$) according to a value of the vehicle speed signal, said predetermined rate of synthesis being varied based upon said predetermined rate distribution gain.

4. An apparatus for an automotive vehicle as set forth in claim 3, wherein said controlling means comprises control determining means for determining whether the value of the steering angular velocity signal exceeds a first predetermined threshold value based on the vehicle speed signal value and for determining whether the value of the steering angular displacement signal exceeds a second predetermined threshold value, and wherein said controlling means generates the control signal on the basis of results of determinations of said control determining means.

5. An apparatus for an automotive vehicle as set forth in claim 4, wherein said control signal is generated as follows:
   (1) When both steering angular velocity signal and steering angular displacement signal do not exceed the first and second predetermined threshold values, respectively;

$$V = \alpha \cdot VB + \beta \cdot VP + \gamma \cdot VR + K_1 \cdot \eta(\theta'_{STR} + G_1 \cdot \theta_{STR}),$$

wherein V denotes the control signal, $\alpha \cdot VB$ denotes the bouncing rate signal, $\beta \cdot VP$ denotes the rolling rate signal, $\gamma \cdot VR$ denotes the rolling angular displacement signal, $K_1$ denotes a predetermined gain, $G_1$ denotes a predetermined gain, $\theta'_{STR}$ denotes a steering angular velocity, $\theta_{STR}$ denotes a steering angular displacement, and $K_1 \cdot \eta(\theta'_{STR} + G_1 \cdot \theta_{STR})$ denotes the rolling signal during no steering operation state,
   (2) When both steering angular velocity signal and steering angular displacement signal exceed the first and second predetermined threshold values, respectively;

$$V = \alpha \cdot VB + \beta \cdot VP + K_2(1-\eta)(\theta'_G + G_2 \cdot \theta_G) + K_1 \cdot \eta(\theta'_{STR} + G_1 \cdot \theta_{STR}),$$

wherein V denotes the control signal, $\alpha \cdot VB$ denotes the bouncing rate signal, $\eta \cdot VP$ denotes the rolling rate signal, $\eta$ denotes the predetermined rate distribution gain, $\theta'_G$ denotes a rolling angular velocity, $\theta'_{STR}$ denotes a steering angular velocity, $\theta_{STR}$ denotes a steering angular displacement, $G_1$ and $G_2$ denote respective predetermined gains, $K_1$ and $K_2$ denote respective predetermined gains, and $K_1 \cdot \eta(\theta'_{STR} + G_1 \cdot \theta_{STR})$ denote the roll rate signal during no steering operation state.

6. An apparatus for an automotive vehicle as set forth in claim 5, wherein said predetermined rate distribution gain $\eta$ indicates 1.0 when the vehicle speed falls in a predetermined relatively low speed range and as the vehicle speed increases and exceeds a predetermined relatively low speed range limit (P), the value of $\eta$ is decreased from 1.0 in a reverse proportion to the value of the vehicle speed.

7. An apparatus for an automotive vehicle as set forth in claim 6, wherein said controlling means further comprises second control determining means for determining whether a level of the steering angular velocity signal is reduced and exceeds a third predetermined threshold value and timer means for measuring a time and determining whether a predetermined time ($T_{STR}$) has passed upon the determination that the level of the steering angular velocity signal is reduced and exceeds the third predetermined threshold value and wherein said control means generates the control signal V according to the formula of (1).

8. An apparatus for an automotive vehicle as set forth in claim 7, wherein the first predetermined threshold value and the third predetermined threshold value are varied according to the vehicle speed.

9. An apparatus for an automotive vehicle as set forth in claim 8, wherein the first and third predetermined threshold values are decreased in a reverse proportion to the value of the vehicle speed signal in a stepwise manner.

10. An apparatus for an automotive vehicle as set forth in claim 9, wherein the bounce rate signal is derived on the basis of a bouncing component signal VB of each vertical sprung mass velocity signal passed from a first predetermined band pass filter which is multiplied by a gain of $\alpha$, the pitch rate signal is derived on the basis of a pitching component signal VP passed from a second predetermined band pass filter which is multiplied by a gain of $\beta$, the roll rate signal is derived on the basis of a rolling component signal passed from a third predetermined band pass filter which is multiplied by a gain of $\gamma$, and the roll rate signal is switched between $K_1 \cdot \eta(\theta'_{STR} + G_1 \cdot \theta_{STR})$ and $K_2 (1-\eta)(\theta'_G + G_2 \cdot \theta_G)$ depending on the steering operation state.

11. A method for controlling damping force characteristics of respective vehicular shock absorbers, comprising the steps of:

a) detecting vertical accelerations of a sprung mass at at least two of right and left positions of a vehicle body with respect to a vehicular forward/rearward direction and outputting vertical acceleration signals indicative thereof;

b) determining vertical sprung mass velocity signals on the basis of the respective vertical sprung mass acceleration signals;

c) detecting a steering angular displacement and a steering angular velocity from a vehicular steering system and outputting signals indicative thereof;

d) generating a control signal by synthesizing a bouncing rate signal based on each corresponding one of the vertical sprung mass velocity signals, a rolling rate signal based on a difference between the respective vertical sprung mass velocity signals for right and left positions of the vehicle body, a rolling angular displacement signal based on the vertical sprung mass velocity signals for the right and left positions of the vehicle body and a rolling angular gain, the steering angular displacement signal and the steering angular velocity signal, said synthesizing being at a predetermined rate of synthesis;

e) converting said control signal into a drive signal;

f) variably setting the predetermined rate of synthesis according to the steering angular velocity signal and steering angular displacement signal; and g) changing the damping force characteristic of each shock absorber so as to set a target damping force characteristic in response to the drive signal according to the content of the control signal.

12. An apparatus for controlling damping force characteristics of vehicular shock absorbers, comprising:

a) a plurality of shock absorbers, each shock absorber being interposed between a sprung mass and an unsprung mass of a vehicle and having damping force characteristic changing means for operatively setting a damping force characteristic in response to a drive signal input thereto;

b) vertical sprung mass acceleration detecting means for detecting vertical accelerations of the sprung mass at a right position and a left position of the vehicle body with respect to a forward direction of travel and outputting respective vertical acceleration signals indicative thereof; p1 c) vertical sprung mass velocity determining means for determining vertical sprung mass velocity signals corresponding to the right and left positions of the vehicle body on the basis of the respective vertical sprung mass acceleration signals;

d) steering state detecting means for detecting a steering angular displacement and a steering angular velocity from a steering system of the vehicle and outputting signals indicative thereof;

e) controlling means for controlling the damping force characteristic of each of the shock absorbers on the basis of a control signal, said control signal being a synthesization of at least a vertical sprung mass velocity signal output from the vertical sprung mass velocity determining means corresponding to the respective shock absorber, a difference between the vertical sprung mass velocity signals for the left and right positions of the vehicle body, a difference between an angular displacement of the left and right positions of the vehicle body as determined from the vertical sprung mass velocity determining means, the steering angular displacement signal, and the steering angular velocity signal, said controlling means having means for synthesizing said control signal at a predetermined rate of synthesis and for converting said control signal into the drive signal; and f) rate of synthesis setting means for variably setting the predetermined rate of synthesis according to the steering angular velocity signal and steering angular displacement signal.

* * * * *